United States Patent
Takasaki et al.

(10) Patent No.: US 9,822,676 B2
(45) Date of Patent: Nov. 21, 2017

(54) STRUCTURE FOR ATTACHING OIL JET VALVE

(71) Applicants: TOYOTA JIDOSHA KABUSHIKI KAISHA, Toyota-shi, Aichi-ken (JP); AISIN SEIKI KABUSHIKI KAISHA, Kariya-shi, Aichi-ken (JP)

(72) Inventors: Shinya Takasaki, Nagoya (JP); Eiji Miyachi, Nishio (JP)

(73) Assignees: TOYOTA JIDOSHA KABUSHIKI KAISHA, Toyota (JP); AISIN SEIKI KABUSHIKI KAISHA, Kariya (JP)

( * ) Notice: Subject to any disclaimer, the term of this patent is extended or adjusted under 35 U.S.C. 154(b) by 0 days.

(21) Appl. No.: 15/110,234

(22) PCT Filed: Jan. 15, 2015

(86) PCT No.: PCT/JP2015/050910
§ 371 (c)(1),
(2) Date: Jul. 7, 2016

(87) PCT Pub. No.: WO2015/108099
PCT Pub. Date: Jul. 23, 2015

(65) Prior Publication Data
US 2016/0326920 A1 Nov. 10, 2016

(30) Foreign Application Priority Data
Jan. 17, 2014 (JP) .................. 2014-006515

(51) Int. Cl.
*F02F 7/00* (2006.01)
*F01M 1/08* (2006.01)
(Continued)

(52) U.S. Cl.
CPC ................ *F01M 1/08* (2013.01); *F01M 1/16* (2013.01); *F01P 3/06* (2013.01); *F02F 7/0068* (2013.01); *F16N 21/00* (2013.01); *F01P 3/08* (2013.01)

(58) Field of Classification Search
CPC .. F01M 1/08; F01M 1/16; F16N 21/00; F02F 7/0068; F01P 3/06; F01P 3/08;
(Continued)

(56) References Cited

U.S. PATENT DOCUMENTS 2,940,472 A * 6/1960 Chilcoat ............... F16K 15/063
137/540
3,741,342 A * 6/1973 Maddalozzo ............ F01M 1/10
123/196 A
(Continued)

FOREIGN PATENT DOCUMENTS

DE 60214626 T2 10/2007
EP 0947285 A1 10/1999
(Continued)

*Primary Examiner* — Hung Q Nguyen
(74) *Attorney, Agent, or Firm* — Oliff PLC

(57) ABSTRACT

A structure for attaching an oil jet valve includes a bracket secured to an internal combustion engine with a seal member, an attachment concavity extending through the interior of the bracket, an insertion hole extending through the interior of the internal combustion engine, an oil jet valve, a first stepped part formed in the oil jet valve, a second stepped part formed in the attachment concavity, and an interlocking member. The width of a wide part of the first stepped part is less than the width of a narrow part of the second stepped part. The width of the wide part of the first stepped part is less than the width of a portion, of the inner surface of the attachment concavity, that faces the wide part of the first stepped part.

4 Claims, 4 Drawing Sheets

(51) Int. Cl.
*F01P 3/06* (2006.01)
*F01M 1/16* (2006.01)
*F16N 21/00* (2006.01)
*F01P 3/08* (2006.01)

(58) Field of Classification Search
CPC ...... F16K 27/0209; F16K 27/00; F16K 27/02; F16K 15/02; F16K 15/025; F16K 15/06; F16K 15/063
See application file for complete search history.

(56) References Cited

U.S. PATENT DOCUMENTS

| | | | |
|---|---|---|---|
| 4,142,282 | A | 3/1979 | Johnson |
| 5,740,777 | A | 4/1998 | Yamamoto et al. |
| 2003/0005893 | A1 | 1/2003 | Bontaz |
| 2012/0261009 | A1* | 10/2012 | Miyachi ............... F01L 1/3442 137/565.01 |

FOREIGN PATENT DOCUMENTS

| | | |
|---|---|---|
| JP | S60-127423 U | 8/1985 |
| JP | H02-301648 A | 12/1990 |
| JP | H09-133235 A | 5/1997 |
| JP | H11-182242 A | 7/1999 |
| JP | H11-210906 A | 8/1999 |
| JP | 2009-293380 A | 12/2009 |
| KR | 100215408 B1 | 5/1999 |

\* cited by examiner

STRUCTURE FOR ATTACHING OIL JET VALVE

TECHNICAL FIELD

The present invention relates to structure for coupling an oil jet valve, which regulates the amount of oil supplied to an oil jet, to an internal combustion engine.

BACKGROUND ART

A known oil jet injects oil to a piston of an internal combustion engine (refer to patent document 1).

The internal combustion engine described in patent document 1 includes an oil jet passage, which is supplied with oil, oil jets, which are connected to the oil jet passage, and an oil jet valve, which regulates the amount of oil supplied from the oil jet passage to the oil jets. The internal combustion engine includes a socket that communicates the outside of the internal combustion engine with the oil jet passage. The oil jet valve is fitted into and fixed to the socket. Further, a flange is formed on the outer surface of the oil jet valve and shaped projecting outwardly. A seal member is held between the flange and the outer surface of the internal combustion engine. The seal member restricts the leakage of oil from the internal combustion engine through the gap between the oil jet valve and the socket of the engine.

PRIOR ART DOCUMENT

Patent Document

Patent Document 1: Japanese Laid-Open Patent Publication No. 11-182242

SUMMARY OF THE INVENTION

Problem to be Solved by the Invention

In the internal combustion engine, when the formation angle of the socket is incorrect or when the oil jet valve is fixed at an incorrect angle, the structure for coupling the oil jet valve decreases the parallelism of the opposing surfaces of the flange of the valve and the outer surface of the internal combustion engine (specifically, rim of socket). In this case, sufficient planar pressure cannot be provided at the portion where the flange or outer surface of the internal combustion engine contacts the seal member. This may lower the sealing performance of the seal member.

It is an object of the present invention to provide an oil jet valve coupling structure that restricts oil leakage from the portion where the oil jet valve is coupled.

Means for Solving the Problem

To achieve the above object, one aspect of the present invention is an oil jet valve coupling structure including a bracket fixed to an internal combustion engine with a seal member located in between. A coupling recess extends inside the bracket and opens in an opposing surface opposed to the internal combustion engine. A socket extends inside the internal combustion engine and opens in an opposing surface opposing the bracket. An oil jet valve includes a first end and a second end. The oil jet valve is coupled to the internal combustion engine with the first end fitted into the coupling recess and the second fitted into the socket. A step-shaped first step is formed on the oil jet valve. The first step includes a wide portion, which is where the oil jet valve has a large width in a direction orthogonal to a direction in which the oil jet valve is fitted into the coupling recess and which is a fitted portion of the oil jet valve fitted into the coupling recess, and a narrow portion, which is formed closer to the internal combustion engine than the wide portion and which is where the oil jet valve has a small width in the orthogonal direction. A step-shaped second step is formed in the coupling recess. The second step includes a wide portion, which is where the coupling recess has a large width in the orthogonal direction, and a narrow portion, which is formed closer to the internal combustion engine than the wide portion and which is where the coupling recess has a small width in the orthogonal direction. A securing member is located between the first step and the second step. The wide portion of the first step has a smaller width than the narrow portion of the second step, and the wide portion of the first step has a smaller width than a portion of an inner surface of the coupling recess opposed to the wide portion of the first step.

EMBODIMENTS OF THE INVENTION

One embodiment of an oil jet valve coupling structure will now be described.

Figure 1:
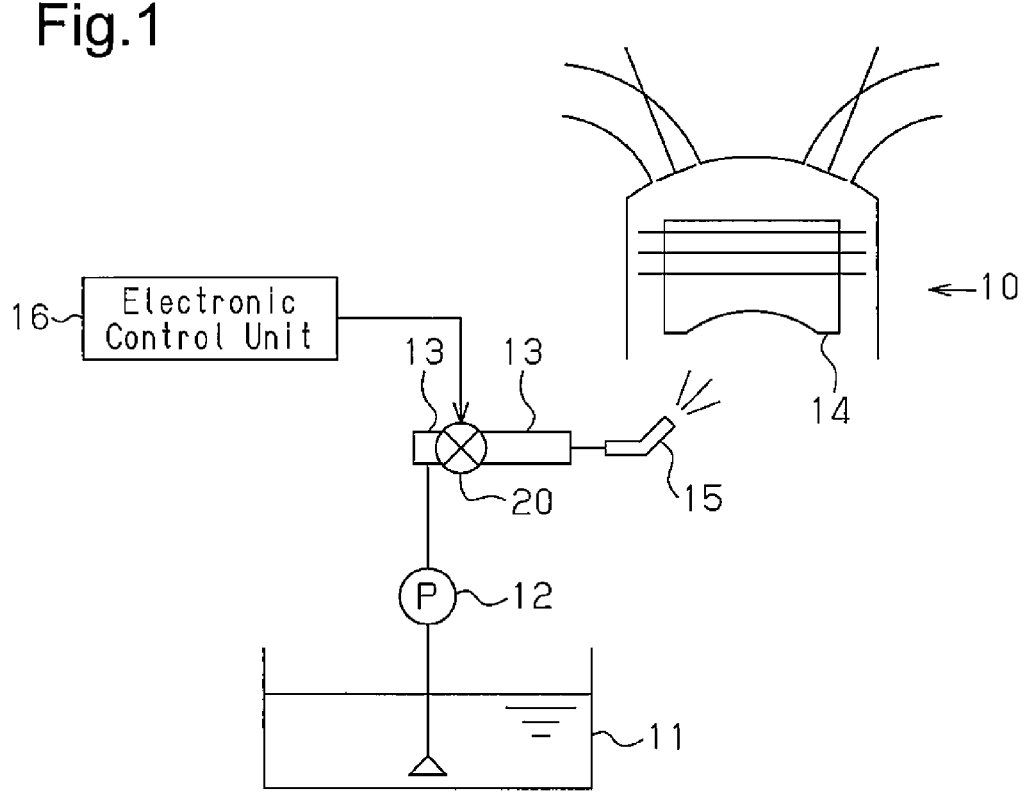
FIG. 1 is a schematic diagram showing an internal combustion engine to which an oil jet valve coupling structure according to one embodiment of the present invention is applied.
Figure 2:
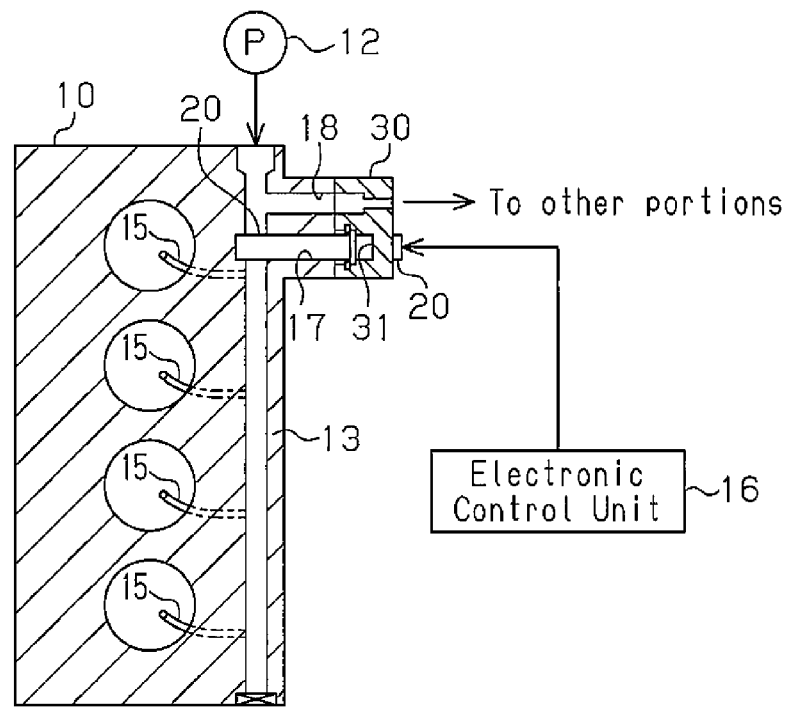
FIG. 2 is a cross-sectional view of a bracket and the internal combustion engine shown in FIG. 1.

As shown in FIGS. 1 and 2, an internal combustion engine 10 is provided with an oil pan 11, which collects oil, and an oil pump 12, which pumps oil from the oil pan 11. Further, an oil jet passage 13 is formed in the internal combustion engine 10. The oil pump 12 supplies the oil jet passage 13 with the pumped oil. Oil jets 15 are coupled to the inside of the internal combustion engine 10 to inject and blast oil toward pistons 14. The oil jets 15 are connected to the oil jet passage 13.

An oil jet valve 20 (specifically, sleeve including a valve member that is movable back and forth therein) is coupled to the internal combustion engine 10. When the oil jet valve 20 is open, the supply of oil to the oil jets 15 through the oil jet passage 13 is permitted, and oil is injected from the oil jets 15. When the oil jet valve 20 is closed, the supply of oil to the oil jets 15 through the oil jet passage 13 is stopped, and the injection of oil from the oil jets 15 is also stopped.

The internal combustion engine 10 includes an electronic control unit 16 serving as a peripheral device and formed by, for example, a microcomputer or the like. The electronic control unit 16 acquires detection signals from various sensors, which are used to detect the operation condition of the internal combustion engine 10, and performs various calculations based on the detection signals. Further, the electronic control unit 16 executes various controls related to the engine condition based on the calculation results such as actuation control of the oil jet valve 20.

A coupling structure of the oil jet valve 20 will now be described.

Figure 3:
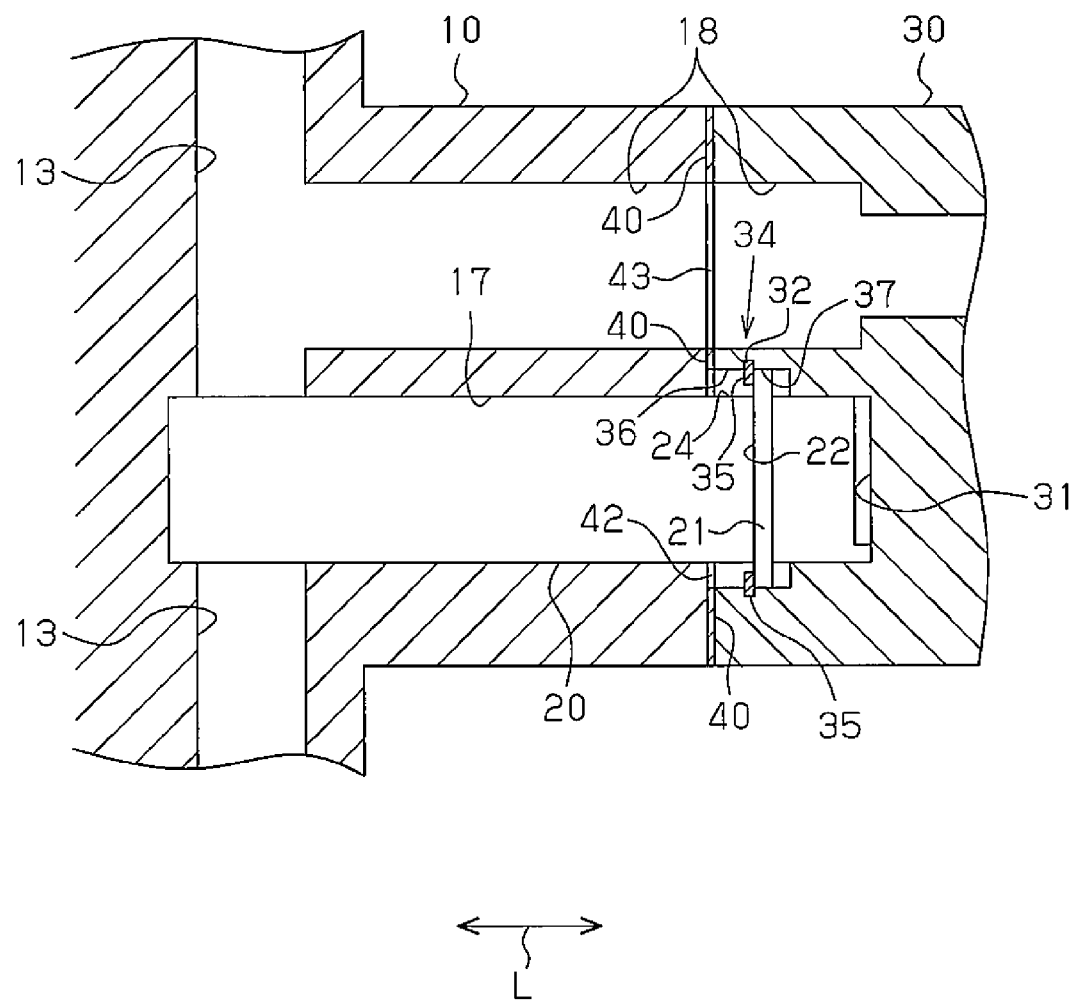
FIG. 3 is an enlarged cross-sectional view of an oil jet valve shown in FIG. 2 and its surrounding.

As shown in FIGS. 2 and 3, a bracket 30, which is used to couple the oil jet valve 20, is fixed to the internal combustion engine 10. The oil jet valve 20 is secured to the bracket 30 and coupled to the internal combustion engine 10 together with the bracket 30. A socket 17 is formed inside the internal combustion engine 10 and shaped to extend to the oil jet passage 13 and open in a surface opposing the bracket 30. The oil jet valve 20 includes a first end and a second end. Further, the oil jet valve 20 is coupled to the internal combustion engine 10, with the first end fitted into and secured to a coupling recess 31 of the bracket 30, and the second end fitted into and secured to the socket 17 of the internal combustion engine 10.

Figure 4:
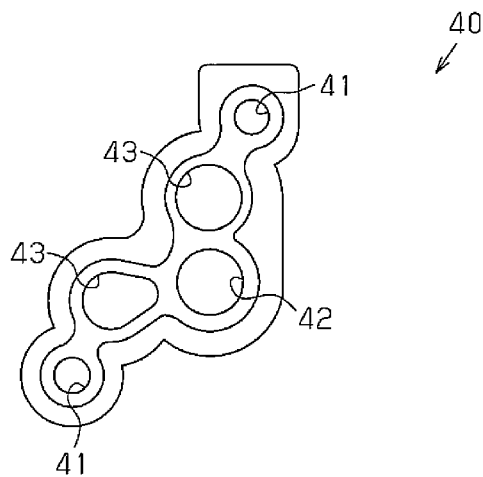
FIG. 4 is a plan view of a seal member shown in FIG. 3.

In the present embodiment, the bracket 30 is fastened by bolts to the internal combustion engine 10 with a seal member 40 held between the internal combustion engine 10 and the bracket 30. As shown in FIG. 4, the seal member 40 includes insertion holes 41, through which fastening bolts are inserted, and an insertion hole 42, through which the oil jet valve 20 is inserted. The seal member 40 restricts oil leakage from between the internal combustion engine 10 and the bracket 30. In addition to the passage in which the oil jet valve 20 is arranged (socket 17 and coupling recess 31), the internal combustion engine 10 (refer to FIG. 3) and the bracket 30 includes passages that communicate the inside of the internal combustion engine 10 and the inside of the bracket 30 (e.g., passage 18 in FIG. 2). Thus, the seal member 40 (FIG. 4) also includes through holes 43 connected to the passages.

When coupling the oil jet valve 20 as described above, rigid fixing of the oil jet valve 20 to the bracket 30 through press-fitting or bolt-fastening may lead to the shortcoming described below.

When fitting the oil jet valve 20 into the socket 17 of the internal combustion engine 10 to fix the bracket 30 to the internal combustion engine 10, the relationship of the formation angle of the socket 17 in the internal combustion engine 10 and the fixing angle of the oil jet valve 20 in the bracket 30 sets the relative positions of the internal combustion engine 10 and the bracket 30. Thus, when the formation angle of the socket 17 is incorrect due to manufacturing tolerances or when the oil jet valve 20 is fixed to the bracket 30 at an incorrect angle, the relative positions of the internal combustion engine 10 and the bracket 30 may be shifted. Such shifting of the relative positions decreases the parallelism with respect to the surfaces joined with the internal combustion engine 10 and the bracket 30. Thus, sufficient planar pressure cannot be provided at the portion where the internal combustion engine 10 or the bracket 30 contacts the seal member 40. This may lower the sealing performance of the seal member 40.

In this respect, the present embodiment employs the structure described below as a structure for coupling the oil jet valve 20 to the bracket 30.

Figure 5:
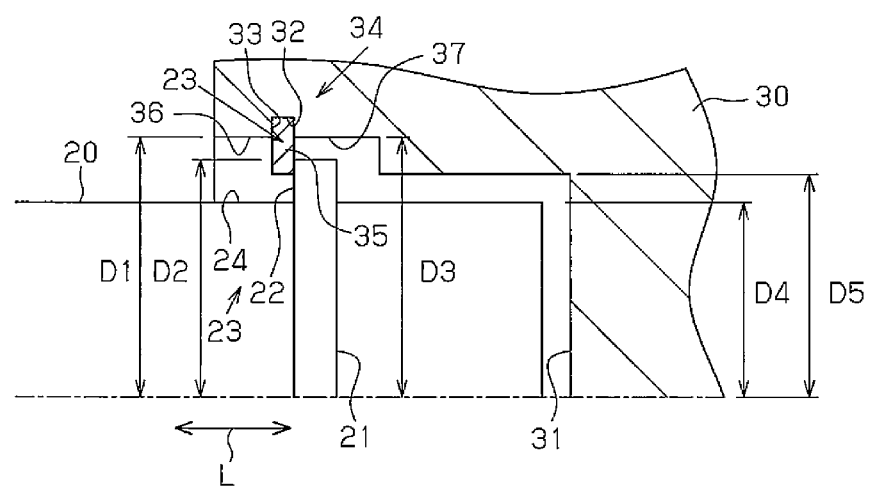
FIG. 5 is a partial, cross-sectional view illustrating the relationship of the outer surface of the oil jet valve and the inner surface of a coupling recess that are shown in FIG. 3.

As shown in FIGS. 3 and 5, the oil jet valve 20 is formed to have a circular cross-section in a direction orthogonal to the direction L in which the valve 20 is fitted into the coupling recess 31. A flange 21 is formed on the outer surface of the oil jet valve 20 projecting from the entire circumference of the oil jet valve 20. Thus, the outer surface of the oil jet valve 20 includes a first step 23 that is step-shaped and formed by the edge of the flange 21, a portion closer to the internal combustion engine 10 than the flange 21 (small diameter portion 24), and a side surface of the flange 21 (step surface 22) connecting the edge of the flange 21 and the portion closer to the internal combustion engine 10 than the flange 21. In the present embodiment, the edge of the flange 21 is the portion of the oil jet valve 20 fitted into the coupling recess 31. The edge of the flange 21 corresponds to a wide portion of the oil jet valve 20. In a direction orthogonal to the direction L in which the oil jet valve 20 is fitted into the coupling recess 31, the oil jet valve 20 has a width (length in vertical direction of FIG. 3) that is larger at the wide portion of the oil jet valve 20 than the portion of the oil jet valve 20 closer to the internal combustion engine 10 than the groove 32. The edge of the flange 21 corresponds to a large diameter portion of the oil jet valve 20 that has a large outer diameter. The small diameter portion 24 corresponds to a narrow portion where the width of the oil jet valve 20 is small in a direction orthogonal to the direction L in which the oil jet valve 20 is fitted into the coupling recess 31.

The coupling recess 31 of the bracket 30 is formed to have a circular cross-section in a direction orthogonal to the direction L in which the oil jet valve 20 is fitted into the coupling recess 31. An annular groove 32 is formed in the inner surface of the coupling recess 31 extending around the entire circumference of the oil jet valve 20. Thus, the inner surface of the coupling recess 31 includes a second step 34 that is step-shaped and formed by the bottom of the groove 32, a portion of the inner surface of the coupling recess 31 closer to the internal combustion engine 10 than the groove 32 (small diameter portion 36), and a side surface of the groove 32 (step surface 33) connecting the bottom of the groove 32 and the portion closer to the internal combustion engine 10 than the groove 32. In the present embodiment, the bottom of the groove 32 corresponds to the wide portion of the coupling recess 31. In the direction orthogonal to the fitting direction L, the coupling recess 31 has a width that is larger at the wide portion of the coupling recess 31 than the portion of the coupling recess 31 closer to the internal combustion engine 10 than the groove 32. The bottom of the groove 32 corresponds to a large diameter portion of the coupling recess 31 that has a large inner diameter. The small diameter portion 36 corresponds to a narrow portion where the width of the coupling recess 31 is small in a direction orthogonal to the fitting direction L.

A snap ring 35 is fitted into the groove 32 of the coupling recess 31. The snap ring 35 is held between the first step 23 and the second step 34 with one surface opposed to the step surface 22 in the first step 23 of the oil jet valve 20 and the other surface opposed to the step surface 33 in the second step 34 of the coupling recess 31.

As shown in FIG. 5, in the present embodiment, the outer radius D2 of the edge of the flange 21 of the oil jet valve 20 is smaller than the inner radius D1 of the small diameter portion 36 in the coupling recess 31. Further, the outer radius D2 of the edge of the flange 21 is smaller than the inner radius D3 of the portion in the inner surface of the coupling recess 31 opposing the edge of the flange 21 (opposing portion 37). The outer radius D4 of the portion of the oil jet valve 20 farther from the internal combustion engine 10 than the flange 21 is smaller than the inner radius D5 of where the inner surface of the coupling recess 31 is opposed to the portion of the oil jet valve 20 farther from the internal combustion engine 10 than the flange 21. In FIG. 5, the difference between the outer radius D2 and the inner radius D3 and the difference between the outer radius D4 and the inner radius D5 are illustrated in an exaggerated manner to aid understanding. The differences are actually smaller.

The operation of the coupling structure of the oil jet valve 20 will now be described.

Figure 6A:
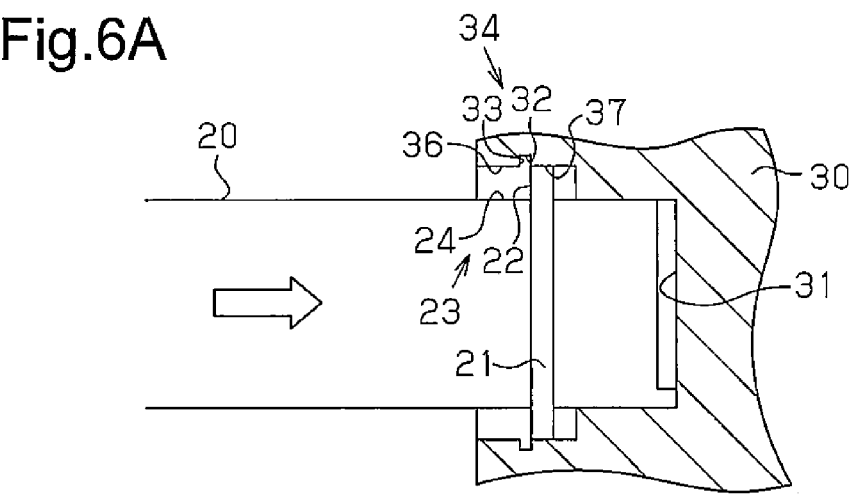
FIGS. 6A and 6B are cross-sectional views showing the portion around the oil jet valve during a coupling process.

In the present embodiment, as shown in FIG. 6A, the outer diameter D2 of the edge of the flange 21 on the outer surface of the oil jet valve 20 (refer to FIG. 5) is smaller than the inner radius D1 of the small diameter portion 36 in the inner surface of the coupling recess 31 (refer to FIG. 5). Thus, as shown by the arrow in FIG. 6A, when coupling the oil jet valve 20 to the bracket 30, the first end of the oil jet valve 20 can be fitted into the coupling recess 31 of the bracket 30. Further, in the present embodiment, the oil jet valve 20 has a circular cross section that is orthogonal to the direction L in which the oil jet valve 20 is fitted into the coupling recess 31, and the coupling recess 31 has a circular cross section that is orthogonal to the fitting direction L. Thus, the oil jet valve 20 can be coupled to the bracket 30 in the same manner as when inserting an object having an outer surface with a circular cross section into a recess having a circular cross section. This simplifies the positioning task.

Figure 6B:
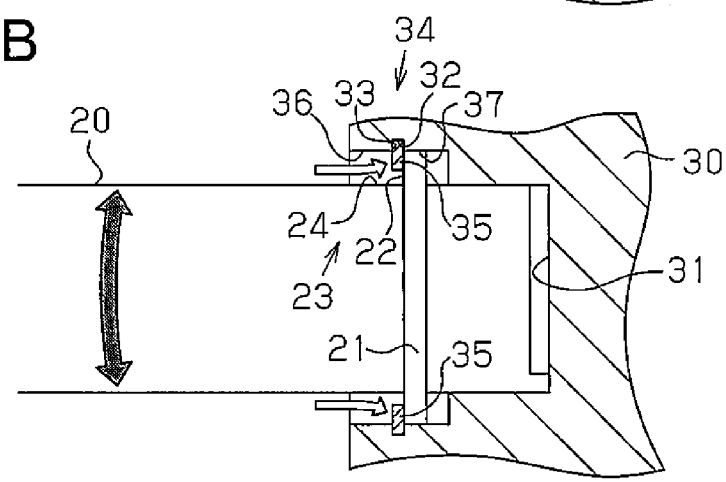

Moreover, as shown in FIG. 6B, when the first end of the oil jet valve 20 is fitted into the coupling recess 31, a clearance is formed between the small diameter portion 24 of the outer surface of the oil jet valve 20 and the small diameter portion 36 in the inner surface of the coupling recess 31. As shown by the arrow in FIG. 6B, this allows the snap ring 35 to be passed through the clearance in a compressed state to a position where it comes into contact with the step surface 22 of the first step 23 of the oil jet valve 20 (specifically, side surface of flange 21). The snap ring 35 is then enlarged at that position and fitted into the groove 32 in the coupling recess 31.

Consequently, engagement with the inner surface of the groove 32 in the coupling recess 31 restricts movement of the snap ring 35. Further, the snap ring 35 is held between the first step 23 on the outer surface of the oil jet valve 20 and the second step 34 in the inner surface of the coupling recess 31. Thus, the step surface 22 of the first step 23 of the oil jet valve 20 contacts the snap ring 35 and restricts separation of the oil jet valve 20 from the coupling recess 31. In this manner, the snap ring 35 supports the first end of the oil jet valve 20 in a manner inseparable from the coupling recess 31 of the bracket 30.

Further, in the present embodiment, even when the oil jet valve 20 is coupled to the bracket 30, a clearance (i.e., play) is formed between the oil jet valve 20 and the coupling recess 31. In addition, the engagement of the side surface (step surface 22) of the flange 21 of the oil jet valve 20 with the snap ring 35 fixed in the coupling recess 31 secures the first end of the oil jet valve 20 in the coupling recess 31. The clearance between the oil jet valve 20 and the coupling recess 31 allows the end of the oil jet valve 20 to move inside the coupling recess 31, and the movement allows the distal end of the oil jet valve 20 to pivot as shown by the shaded arrow in FIG. 6B.

Therefore, when fixing the bracket 30 to the internal combustion engine 10 (refer to FIG. 3), the oil jet valve 20 may be fitted into the socket 17 of the internal combustion engine 10 under a condition in which the distal end of the oil jet valve 20 is pivotal. Accordingly, when the formation angle of the socket 17 in the internal combustion engine 10 differs from the desired angle, the oil jet valve 20 may be inclined in accordance with such a difference when fitted into the socket 17. This allows the bracket 30 to be coupled to the internal combustion engine 10, without interference caused by contact of the outer surface of the oil jet valve 20 and the inner surface of the socket 17, so that the parallelism is increased at the joining surfaces of the internal combustion engine 10 and the bracket 30. Thus, the planar pressure is sufficient at the portion where the joining surfaces of the internal combustion engine 10 and the bracket 30 contact the seal member 40, which is located between the joining surfaces. This restricts oil leakage from the joining surfaces in a preferred manner.

The present embodiment has the advantages described below.

(1) Oil leakage is restricted in a preferred manner from the joining surfaces of the internal combustion engine 10 and the bracket 30.

(2) The snap ring 35 is passed in a compressed state through the clearance between the outer surface of the oil jet valve 20 and the inner surface of the coupling recess 31 and moved to a position where it comes into contact with the step surface 22 of the first step 23 of the oil jet valve 20. The snap ring 35 is then enlarged at that position. This holds the snap ring 35 at a position located between the first step 23 and the second step 34.

(3) The oil jet valve 20 has a circular cross section that is orthogonal to the direction L in which the oil jet valve 20 is fitted into the coupling recess 31, and the coupling recess 31 has a circular cross section that is orthogonal to the fitting direction L. This simplifies positioning when coupling the oil jet valve 20 to the bracket 30.

The above embodiment may be modified as described below.

Instead of the snap ring 35, a swaging member may be secured in the groove 32 of the coupling recess 31 through a swaging process. The swaging member is arranged in the following manner. First, the swaging member is passed through the clearance between the outer surface of the oil jet valve 20 and the inner surface of the coupling recess 31 and moved to a position where it comes into contact with the step surface 22 of the first step 23. At that position, a swaging process is performed to cause plastic deformation of the swaging member so that the rim of the swaging member is engaged with the groove 32 of the coupling recess 31. In such a coupling structure, the swaging member corresponds to a secured member.

Figure 7:
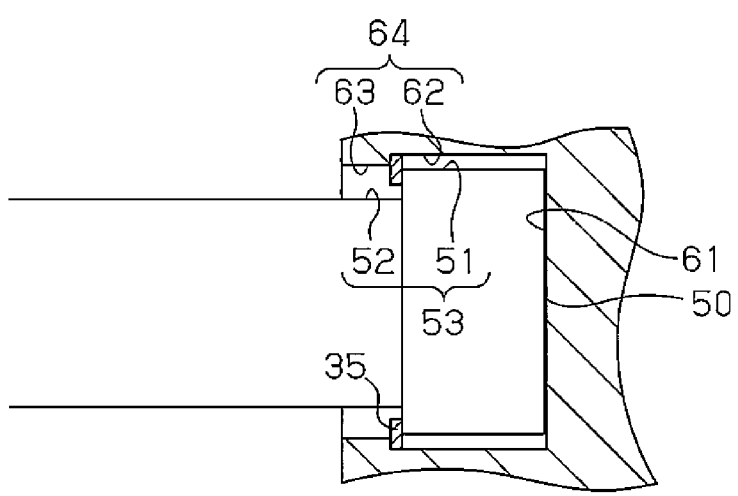
FIG. 7 is a partial, cross-sectional view illustrating the relationship of the outer surface of the oil jet valve and the inner surface of the coupling recess in a modified example.

In the above embodiment, the flange 21 is formed on the outer surface of the oil jet valve 20, and the groove 32 is formed in the inner surface of the coupling recess 31. Instead, as shown in FIG. 7, a first step 53, which is step-shaped, may be arranged on the outer surface of the oil jet valve 50 including a large diameter portion 51, which has a large outer diameter, and a small diameter portion 52, which has a small outer diameter. Further, a second step 53, which is step-shaped, may be arranged in the inner surface of the coupling recess 61 including a large diameter portion 62, which has a large inner diameter, and a small diameter portion 63, which has a small inner diameter. In this case, the outer diameter of the large diameter portion 51 of the first step 53 is smaller than the inner diameter of the small diameter portion 63 of the second step 64. Such a coupling structure also has the same advantages as the above embodiment.

The outer shape of the oil jet valve and the inner shape of the coupling recess in a direction orthogonal to the direction in which the oil jet valve is fitted into the coupling recess may be polygonal in cross section or elliptic in cross section instead of being circular in cross section. Any shape may be used as long as the first end of the oil jet valve can be fitted into the coupling recess of the bracket, and the second end of the oil jet valve can be inserted into the socket of the internal combustion engine.

In this case, the oil jet valve and the bracket may be formed to have a shape as will now be described. The first step, which is step-shaped, is formed on the oil jet valve. The first step is formed including a wide portion, which is the portion of the oil jet valve fitted into the coupling recess and which is where the width of the oil jet valve is large in a direction orthogonal to the direction in which the oil jet valve is fitted into the coupling recess, and a narrow portion, which is formed closer to the internal combustion engine than the wide portion and which is where the width of the oil jet valve is small. Further, the second step, which is step-shaped, is formed in the coupling recess of the bracket. The second step is formed including a wide portion, which is where the width of the coupling recess is large in the direction orthogonal to the fitting direction, and a narrow portion, which is formed closer to the internal combustion engine than the wide portion and which is where the width of the coupling recess is small. The width of the wide portion of the first step is smaller than the width of the narrow portion of the second step, and the width of the wide portion of the first step is smaller than the width of the portion of the inner surface of the coupling recess opposing the wide portion of the first step. Such an oil jet valve coupling structure also has advantages (1) and (2).

The invention claimed is:

1. An oil jet valve coupling structure comprising:
   a bracket fixed to an internal combustion engine with a seal member located in between;
   a coupling recess that extends inside the bracket and opens in an opposing surface opposed to the internal combustion engine;
   a socket that extends inside the internal combustion engine and opens in an opposing surface opposing the bracket;
   an oil jet valve including a first end and a second end, wherein the oil jet valve is coupled to the internal combustion engine with the first end fitted into the coupling recess and the second fitted into the socket;
   a step-shaped first step formed on the oil jet valve, wherein the first step includes a wide portion, which is where the oil jet valve has a large width in a direction orthogonal to a direction in which the oil jet valve is fitted into the coupling recess and which is a fitted portion of the oil jet valve fitted into the coupling recess, and a narrow portion, which is formed closer to the internal combustion engine than the wide portion and which is where the oil jet valve has a small width in the orthogonal direction;
   a step-shaped second step formed in the coupling recess, wherein the second step includes a wide portion, which is where the coupling recess has a large width in the orthogonal direction, and a narrow portion, which is formed closer to the internal combustion engine than the wide portion and which is where the coupling recess has a small width in the orthogonal direction; and
   a securing member located between the first step and the second step, wherein
   the wide portion of the first step has a smaller width than the narrow portion of the second step, and
   the wide portion of the first step has a smaller width than a portion of an inner surface of the coupling recess opposed to the wide portion of the first step.

2. The oil jet valve coupling structure according to claim 1, wherein
   the oil jet valve includes an outer surface with a flange formed thereon projecting from the entire circumference of the oil jet valve;
   the flange includes an edge that defines the wide portion of the first step;
   the outer surface includes a portion closer to the internal combustion engine than the flange that defines the narrow portion of the first step;
   the coupling recess includes an inner surface with an annular groove formed therein extending along the entire circumference of the oil jet valve;
   the groove includes a bottom that defines the wide portion of the second step; and
   the inner surface of the coupling recess includes a portion closer to the internal combustion engine than the groove that defines the narrow portion of the second step.

3. The oil jet valve coupling structure according to claim 1, wherein the securing member is a snap ring.

4. The oil jet valve coupling structure according to claim 1, wherein
   the oil jet valve has a circular cross section in the direction orthogonal to the direction in which the oil jet valve is fitted into the coupling recess;
   the wide portion of the first step is a large diameter portion where the oil jet valve has a large outer diameter, and the narrow portion of the first step is a small diameter portion where the oil jet valve has a small outer diameter;
   the coupling recess has a circular cross section in the direction orthogonal to the direction in which the oil jet valve is fitted into the coupling recess;
   the wide portion of the second step is a large diameter portion where the coupling recess has a large inner diameter, and the narrow portion of the second step is a small diameter portion where the coupling recess has a small inner diameter.

* * * * *